(No Model.) 3 Sheets—Sheet 1.
E. LACHMANN.
ELECTRIC RAILWAY.
No. 579,300. Patented Mar. 23, 1897.
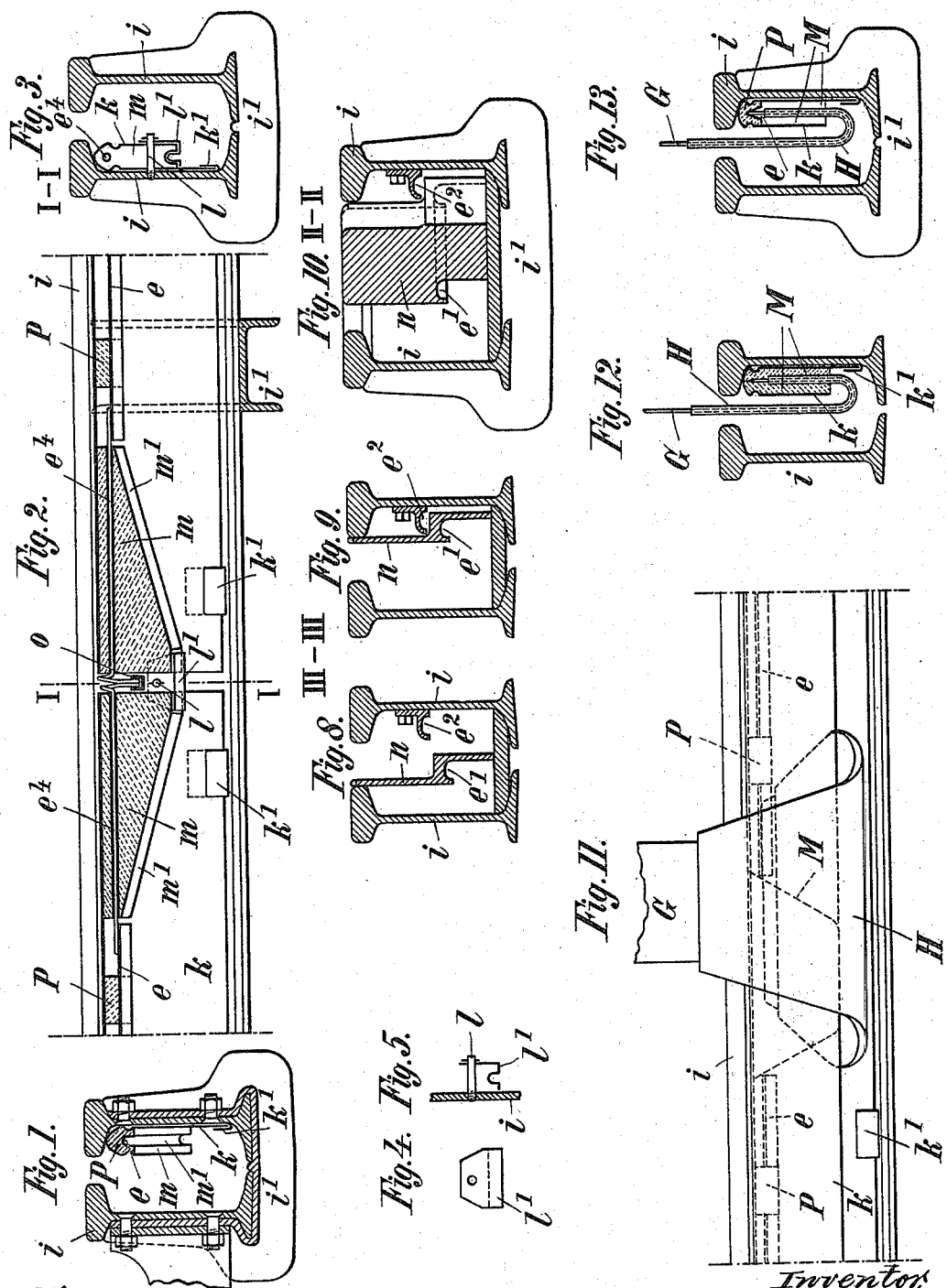

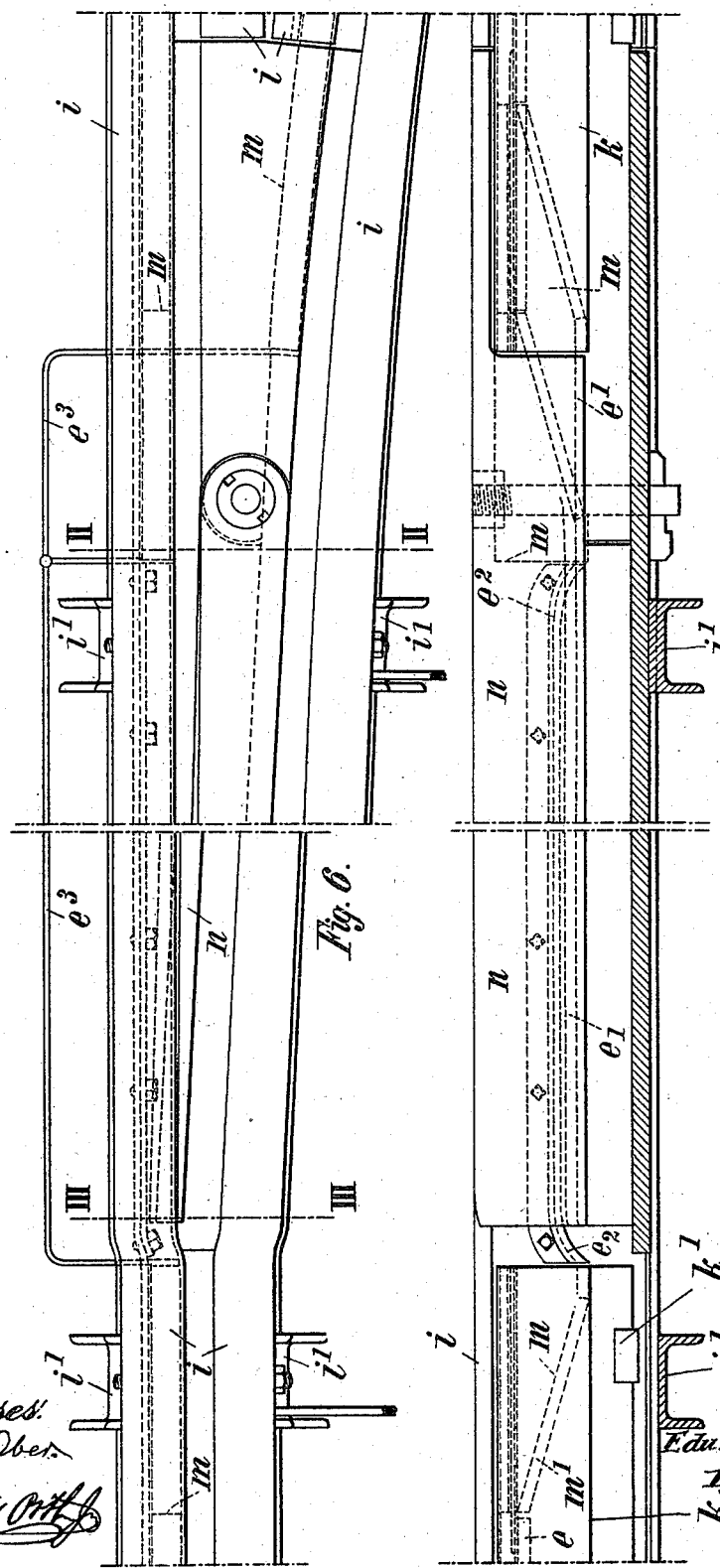

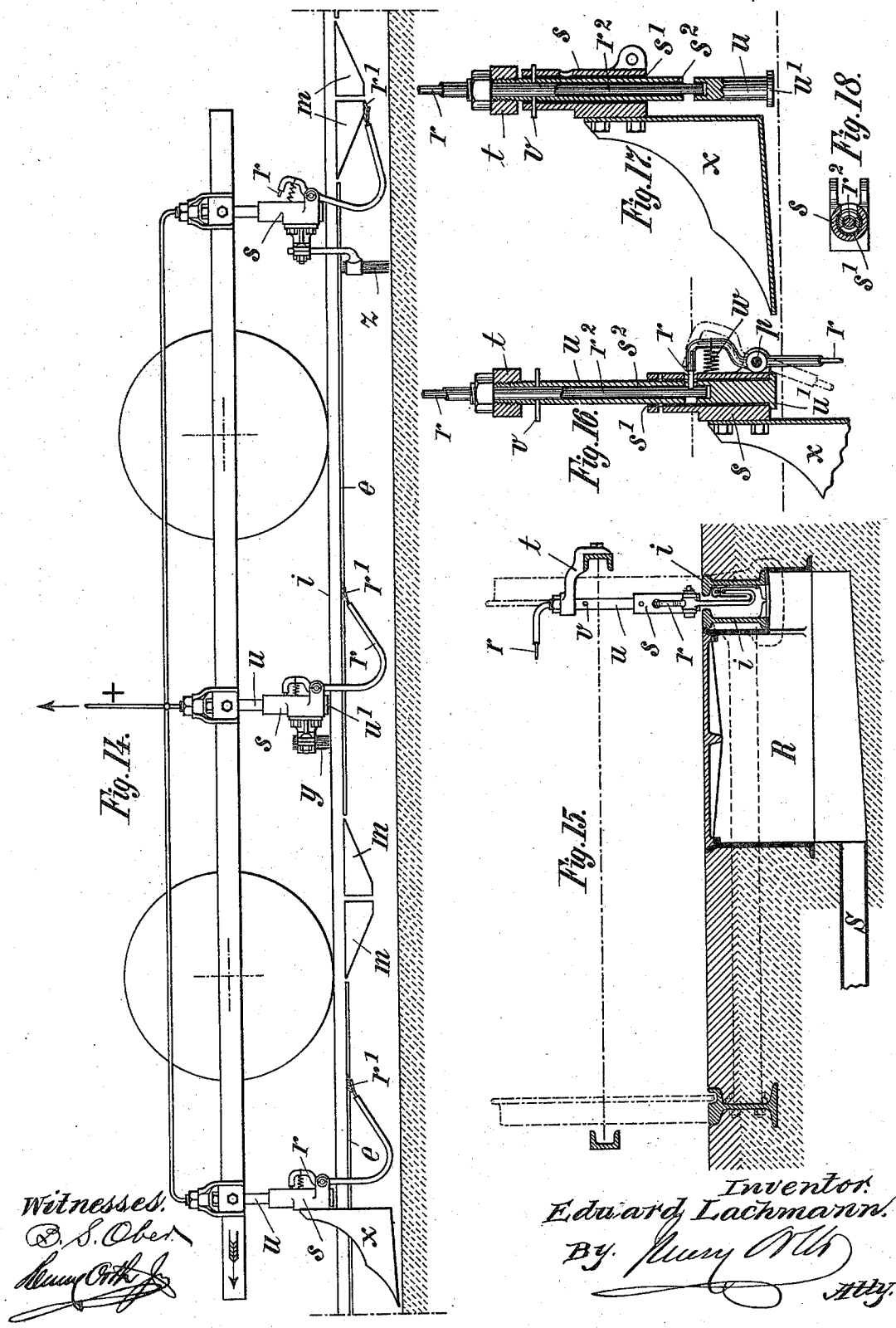

United States Patent Office.

EDUARD LACHMANN, OF HAMBURG, GERMANY.

ELECTRIC RAILWAY.

SPECIFICATION forming part of Letters Patent No. 579,300, dated March 23, 1897.

Application filed June 12, 1895. Serial No. 552,554. (No model.) Patented in Germany April 27, 1895, No. 89,511; in Belgium May 14, 1895, No. 115,609; in France May 14, 1895, No. 247,420; in England May 14, 1895, No. 9,546; in Switzerland May 14, 1895, No. 10,309; in Italy June 30, 1895, No. 38,890; in Austria August 17, 1895, No. 2,894; in Hungary August 30, 1895, No. 3,523, and in Denmark March 20, 1896, No. 465.

*To all whom it may concern:*

Be it known that I, EDUARD LACHMANN, a subject of the Emperor of Germany, residing at Hamburg, in the German Empire, have invented certain new and useful Improvements in Electric Railways, (for which Letters Patent have been obtained in the following countries, to wit: Germany, No. 89,511, dated April 27, 1895; Belgium, No. 115,609, dated May 14, 1895; France, No. 247,420, dated May 14, 1895; Great Britain, No. 9,546, dated May 14, 1895; Switzerland, No. 10,309, dated May 14, 1895; Italy, No. 38,890, dated June 30,1895; Austria, No. 2,894, dated August 17, 1895; Hungary, No. 3,523, dated August 30, 1895, and Denmark, No. 465, dated March 20, 1896;) and I do hereby declare the following to be a full, clear, and exact description of the invention, such as will enable others skilled in the art to which it appertains to make and use the same, reference being had to the accompanying drawings, and to letters of reference marked thereon, which form a part of this application.

My invention has relation to underground electric railways in which is arranged a bare main-line or supply conductor; and it has for its object means whereby water that may accumulate in the underground conduit is prevented from reaching the bare conductor and establishing a ground connection for or diverting the main-line current.

It has for its further object certain improvements in the construction and arrangement of the main-line or supply conductor, in the construction of the contact-carrying devices and switches, and in the means for keeping one of the track-rails as well as the underground conduit free from obstructions and dust or dirt, as will now be fully described, reference being had to the accompanying drawings, in which—

Figure 1 is a cross-sectional view of the underground conduit through one of the insulating-supports for the main-line or supply conductor. Fig. 2 is a longitudinal vertical section of a portion of the said underground conduit, illustrating the mode of forming air-chambers along one side of the conduit, along which air-chambers the main conductor is carried. Fig. 3 is a section on line I I of Fig. 2, and Figs. 4 and 5 are detail views. Fig. 6 is a plan view, and Fig. 7 a sectional side elevation, of a portion of a track and underground conduit, illustrating my improved train-switch. Figs. 8 and 9 are transverse sections taken on line III III of Fig. 6, showing the switch-tongue in its different positions. Fig. 10 is a like view taken on line II II of said Fig. 6. Fig. 11 is a longitudinal vertical section of a portion of the underground conduit, illustrating one form of contact-carrier. Figs. 12 and 13 are transverse sectional views of the conduit and carrier shown in Fig. 11. Fig. 14 is a longitudinal vertical sectional view of the underground conduit and a side elevation of a portion of the motor-car and contact-carriers supported therefrom. Fig. 15 is a transverse sectional view of an underground electric-railway line, illustrating means for collecting mud and other solid substances swept along the underground conduit. Figs. 16 and 17 are sectional detail views of a preferred form of contact-carrier, Fig. 18 being a cross-sectional detail view thereof.

One of the important features of my invention lies in the construction of the underground conduit, hereinafter referred to as the "main" conduit, and in the means for establishing along one side of the same a series of air-chambers open at their lower end, along which the main-line or supply conductor, hereinafter referred to as the "main" conductor, is carried, the construction being such as not only to admit of the establishment of these air-chambers after the conduit has been completed, but to admit of the removal of any one or more of the air-chambers without disturbing the main conduit. These air-chambers practically form an auxiliary conduit for the main conductor, and will hereinafter be referred to as the "auxiliary" conduit.

The main conduit extends along one side of the surface track and is constructed of parallel rails $i\ i$, secured by bolts to suitable yokes $i'$, so as to leave a continuous passage or slot, hereinafter referred to as the "slot,"

between the rail-heads, the outer one of the two rails constituting one of the track-rails, the slot serving not only as a passage for the contact-carrier, as usual, but also as a groove for the flanges of the wheels on one side of the cars, Fig. 15. Along the inner vertical face of the outer rail I establish an auxiliary conduit open at its lower end constructed to form a series of air-chambers. The auxiliary conduit is constructed of sheet-metal casings U-shaped in section and of such a diameter as to be readily introduced into the main conduit through the slot thereof. In practice I make these sheet-metal casings $k$ about ten feet long, more or less, for convenience of handling and arrange them in an inverted position under the head of the outer rail $i$ of the main conduit, so as to practically form a continuous diving-bell auxiliary conduit extending along the web of the said outer rail $i$ of the main conduit. The outer side of said casings is wider than the inner side, and is supported by hook-shaped bearers $k'$, secured at suitable distances apart to the web of the outer main-conduit rail $i$, the casing being further secured to said web by means of bolts $l$, Fig. 3.

The auxiliary diving-bell conduit constructed as described is divided by cross-partitions arranged at suitable distances apart into a succession of air-chambers. This I accomplish by filling the proximate ends of two casings, for instance, with a non-conductive material $m$, so that the outer faces will converge downwardly and form reverse inclines, the lowermost edge of which is on a line with the lower edge of the inner shorter wall of the casing $k$, the filled-in portion being closed at bottom by channeled rails $m'$—i. e., rails of an inverted-U shape in section—to form a track for the contact-brushes, as hereinafter described. The reversely-inclined tracks formed by the rails $m'$ are bridged by means of channeled bridge pieces or shoes $l'$, secured to the web of the outer main-conduit rail $i$ by the bolts $l$ above referred to, Figs. 2, 4, and 5, thus forming an uninterrupted track from one end of the reverse inclines to the other.

The main conductor $e$ consists of sections of channeled metal rails $e$—i. e., of inverted-U shape in cross-section—supported from the roof of the auxiliary conduit between the partitions by means of suitable insulation-supports, as porcelain supports P, said rail-sections being electrically connected at the points where the continuity of the auxiliary conduit is interrupted by the insulation-partitions $m$ $m$, as follows: A copper wire $e^4$ is embedded in the insulating material $m$ of adjacent casings $k$, the outer ends of said wires being connected with the channeled main-conductor rails $e$ on opposite sides of the partition formed by said insulating material, while the inner ends of said wires are connected together by insertion into an insulation block or socket $o$, Fig. 2, which connection is made after the partitioned sections of the auxiliary conduit have been introduced into the main conduit. The insulation-block is then introduced through the slot into said main conduit between adjacent partitioned sections, after which the latter are secured to the web of the outer main-conduit rail $i$ by means of the bolts $l$ and a suitable pin or key passing through the bolts, Fig. 3.

It will readily be seen that should water from any cause accumulate in the main conduit and rise therein the air in the several airtight chambers will be compressed thereby until the pressure in said chambers is equal to the pressure of the water in the conduit, so that if the depth of the main conduit and the length and depth of the air-chambers are properly proportioned the water in said main conduit will be prevented from rising into contact with the main conductor $e$, thus preventing the grounding of the electric current.

The bridged reverse inclines $m'$ $l'$ present the advantage of forming inclined tracks over which the contact brush or brushes can travel without shock or jerking motion, as would be the case if said partitions were simple septums, such as have heretofore been used.

Instead of constructing the partitions $m$ as described they may be formed by wedge-shaped rubber blocks M, inserted in and held between the walls of the auxiliary conduit $k$ to divide the same into chambers, said blocks being grooved longitudinally for the passage of the contact-brushes H, the main conductor being arranged at the upper end of the groove.

In order that the supply of current may not be interrupted when the contact-brush travels over the insulated reverse inclines $m'$ $m'$, each motor-car will be provided with, preferably, three contact-carriers at such distances apart that the brushes of two of said carriers will be in contact with the main conductor $e$ while one of them is traveling over the said reverse inclines. Although two contact-brushes may be used, I prefer three, so as to absolutely insure a proper supply of current to the electric motor. These contact-carriers are of course so constructed that the brushes thereof can follow the irregular track resulting from the subdivision of the auxiliary conduit into air-chambers. Inasmuch as the cars usually travel at a comparatively high rate of speed, the passage of the contact-brushes from an inclined face of a partition to a main-conductor section is a more or less abrupt one, that tends to throw the said brush out of contact with said main conductor and form an arc. This is, however, effectually avoided where a plurality of contact-carriers are employed and so arranged that the brush of one of the carriers is at all times in contact with the main conductor, or is in contact with said conductor during the passage of one of the brushes from an inclined face of a partition to said conductor. I propose, however, to provide means for interrupting the electric circuit whenever from any cause one of the brushes is moved out of contact with the main conductor $e$, as will now be described, reference being had to Figs. 14, 16, 17, and 18, which, as hereinbefore stated, illustrate the preferred construction of contact-carrier.

To one of the longitudinal girths of the motor-car on the conduit side of the road are secured contact-brackets $t$, Fig. 14, electrically connected together by a suitable conductor C and with the electric motor on the motor-car by a branch conductor C'. The conductor C is electrically connected, either directly or through a branch conductor $r^x$, with a conductor or cable $r^2$, contained in and projecting from the lower end of a tubular holder $s^2$, secured to the contact-bracket $t$ and insulated from the cable $r^2$. The lower end of the conductor $r^2$ is secured within a socket of a cylindrical bearing $u$, having at its lower end an annular flange or collar $u'$, that forms an abutment for and limits the downward motion of the contact-carrier proper, which is adapted to slide upon the tubular holder $s^2$, said flange or collar $u'$ determining the normal operative position of the carrier. The latter consists of a sleeve $s$, lined with an insulating material, as shown at $s'$, and has sliding motion on the bearing $u$ and tubular holder $s^2$, said sleeve being provided with perforated lugs in which is pivoted the contact-arm $r$, consisting of an insulated wire terminating at one end in a contact-brush $r'$ and at the other end in a bare portion that normally projects through an opening in sleeve $s$ below the tubular holder $s^2$ and is held in contact with the cable or conductor $r^2$ at a point between said holder and the bearing $u$ by a spring $w$.

The contact-arm, as shown in several of the figures of drawings, is suitably bent and extends under the outer side wall of the auxiliary conduit and upwardly into the channel of the main conductor $e$, with its brush $r'$ in contact with said conductor.

It will be observed that the contact-arm $r$ is held in contact with the conductor $r^2$ by a yielding connection, namely, the spring $w$, so that whenever said arm is moved out of its normal position, as is the case when its brush is traveling along the reversely-inclined channeled track $m'$ of the insulated partition $m$, the circuit is interrupted, as shown in dotted lines in Fig. 16.

If from any cause it becomes necessary to remove the contact-arm $r$, this may be readily accomplished by simply removing its pivot-pin $p$, when the arm may be dropped sufficiently to clear the outer side wall of the auxiliary conduit, as will be readily understood, and when so removed its carrier $s$ may be moved up along the holder $s^2$ and secured in this elevated position by means of a pin $v$, adapted to be passed through carrier $s$, the holder $s^2$, and conductor $r^2$, as shown in Fig. 17.

From the description of the construction of the carrier $s$ and its support $u s^2$ it will be understood that said carrier is revoluble upon its said supports, so that upon removal of the contact-arm $r$ and lifting of the carrier to remove its plow or brush, hereinafter referred to, from the main conduit said carrier can be turned upon its support to bring the brush or plow in proper position for a reversal of the direction of motion of the car.

Instead of the contact-arm $r$ above described a suitably-bent contact-plate, as a plate of copper G, Figs. 11, 12, and 13, may be used, especially when the partitions are constructed of rubber blocks M, as above set forth, said contact-plate being insulated by any suitable material from a point where it enters the slot to near its edge in contact with the main conductor, as shown in said Figs. 11, 12, and 13, said contact-plate traveling along the channel in said rubber blocks M, with its bare edge in contact with the main conductor or a connecting-wire for the main-conductor sections, thus providing an uninterrupted circuit throughout the line, the channel in the blocks M extending, of course, from their lower edge to the main conductor embedded in said blocks near the roof of the auxiliary conduit.

As hereinbefore stated, I prefer to employ three contact arms and carriers, one in front and one in rear of the motor-car wheels and one between said wheels, as shown in Fig. 14, and as the partitions $m$ in the auxiliary conduit are some distance from one another, especially upon level or approximately level stretches of the road, and as said partitions are not as long as the distance between two contact-brushes, two of said brushes will at all times connect the main conductor $e$ with the motor, thus insuring a sufficient supply of electricity to such motor, and even upon steep gradients the partitions will seldom require to be placed so close together as to prevent this, yet should this become necessary one of the arms will always connect the main conductor with the motor.

Inasmuch as one of the conduit-rails serves also as a track-rail I prefer to provide means for keeping this rail free from dust, dirt, snow, &c., and to this end I provide one of the contact-carriers, preferably the central one, with a brush $y$, Fig. 14, bolted thereto. It is also desirable in underground electric tramways to keep the main conduit free from dirt, &c., especially when the brush $y$, referred to above, is used. To this end I provide the rear contact-carrier with a brush $z$, that sweeps along the floor of said conduit, and the forward carrier with a plow or shovel $x$, that carries along such dirt, &c., the brush $z$ sweeping along what the carrier may have left behind.

As it would not be practicable to carry the dirt from one end of the line to the other, I provide at suitable points along the road collecting-chambers R between the tracks adjacent and leading to the main conduit by a suitable opening in the foot of the rails $i$ $i$, Fig. 15, there being a drain S provided for water and such solid matter as may be carried away by such water, while any solid matter that may otherwise accumulate in said chambers can be removed from time to time by the removal of the cover for such chamber.

I will now describe my improved switch, referring to Figs. 6 to 10, in which $n$ indicates the switch-tongue, which is of course not included in the electric circuit and is provided on its under side with a guide-channel $e'$ for the contact-brush $r'$ or bare edge of plate M, said channel $e'$ registering with a corresponding diverting guide-channel $e^2$, that diverts the brushes from their normal channeled track into the switch-tongue channel $e'$, whatever may be the position of said tongue, as more clearly shown in dotted lines in Fig. 7. The guide-channels $e'$ and $e^2$ are located below the main conductor $e$. As the contact-brushes move from the main conductor into the guide-channels $e^2 e'$ or $e' e^2$, as the case may be, the contact-arms are depressed against the stress of their springs $w$, thereby interrupting the electric circuit.

It will be seen by an inspection of Figs. 8, 9, and 10 that the switch-tongue $n$ is of a width substantially equal to the depth of the main conduit, and in order to facilitate the movements of said tongue I provide a suitable bearing-plate laid on the feet of the conduit-rails $i$ $i$, as shown, this construction practically precluding the breaking of a switch-tongue.

The electric connection between two main-conductor sections $e$ at the branching of two tracks is effected by means of a wire $e^3$, Fig. 6, and during the passage of a train from one track to another one of the contact-brushes remains in contact with a main-conductor section $e$, and before said brush leaves the said section another has moved in contact with the next main-conductor section, the same as is the case when the cars cross the partitions $m$, except that in the case of a switch connection which requires greater length of space one brush only remains in contact with the main conductor, whereby sufficient electricity is supplied to the motor to carry the car or train over the switch connection.

Having thus described my invention, what I claim as new therein, and desire to secure by Letters Patent, is—

1. In electric railways, a main underground conduit, an auxiliary conduit open at its lower end, extending along one side of such main conduit and composed of interspaced sections, insulating-partitions closing each end of said sections, provided with an inclined face, the inclined faces of the partitions of contiguous sections converging downwardly, a bridge bridging the hiatus between the said sections, and an electric conductor embedded in the end partitions of such sections, in combination with a sectional main electric conductor extending along the roof of the auxiliary-conduit sections and connected with the conductors embedded in the partitions thereof, for the purpose set forth.

2. In electric railways, a main underground conduit, an auxiliary conduit open at its lower end extending along one side of such main conduit, insulating-partitions having downwardly-converging faces, and a space between their proximate vertical edges, said partitions dividing the auxiliary conduit into air-chambers, main-conductor sections strung along the roof of said air-chambers, and electric connections between said conductors consisting of two wires embedded in the insulating material of the partitions electrically connected in a block of insulating material in the space between the partition-sections and electrically connected with the main-conductor sections of adjacent air-chambers, for the purpose set forth.

3. In electric railways, a main underground conduit, an auxiliary conduit open at its lower end, extending along one side of said main conduit, insulated partitions having lower horizontal and upwardly-diverging channeled faces, said partitions dividing the auxiliary conduit into air-chambers, and a main conductor carried along the roof of the auxiliary conduit, the sections of said main conductor within the air-chamber being channeled to correspond with the channels in the faces of the partitions, for the purpose set forth.

4. In electric railways, an underground main conduit, an auxiliary conduit open at its lower end extending along one side of such main conduit and composed of interspaced sections, insulating-partitions closing the ends of each section and each having an inclined face, the inclined faces of the partitions of contiguous sections converging downwardly, a bridge bridging the hiatus between two of said sections, and an electric conductor extending along the roof of the said auxiliary conduit and through the partitions thereof, in combination with a motor-car, an electric motor thereon and a contact-carrier electrically connected with such motor and adapted to move along the irregular track formed by said main conductor and partitions, for the purpose set forth.

5. An underground slotted conduit constructed of continuous rail-sections of substantially the form of railway-rails, the webs and feet of said rail-sections constituting the side walls and bottom of the conduit respectively, the slot for such conduit being formed by and between the rail-heads, substantially as set forth.

6. In underground electric railways the combination with the underground conduit and the main conductor therein, of a traveling conductor and a contact-carrier traveling with said conductor and provided with contacts for both the aforesaid conductors, said carrier movable out of the conduit along the traveling conductor, for the purpose set forth.

7. In underground electric railways, the combination with the underground conduit and the main conductor therein, of a traveling conductor, a contact-carrier traveling with said conductor and provided with contacts for both of the aforesaid conductors, said carrier movable out of the conduit along the traveling conductor, and a locking device for locking the carrier against movement when out of such conduit, for the purpose set forth.

8. In underground electric railways, the combination with the underground conduit and the main conductor therein, of a traveling conductor and a contact-carrier provided with contacts for both of said conductors, said carrier movable out of the conduit along the traveling conductor, and means for interrupting the contact between said traveling conductor and one of the contacts of the carrier when so moved, for the purpose set forth.

9. In electric railways, the combination with a motor-car and an electric conductor depending therefrom connected with the motor on the car; of a contact-carrier arranged to revolve and slide along said conductor, and a spring-controlled contact-arm hinged to the carrier and adapted to contact with the conductor, for the purpose set forth.

10. In electric railways, the combination with a motor-car, an electric conductor connected with the motor on said car, a tubular holder for said conductor rigidly connected with the car, and a cylindrical bearing to which the lower end of the conductor is secured; of a contact-carrier loosely mounted on said bearing and holder, and provided with an orifice leading to the conductor between its holder and the aforesaid bearing when said carrier is in its lowermost position, a contact-arm hinged to said carrier and provided with a contact at each end, one of said contacts adapted to pass through the hole in the carrier into contact with the conductor, and a spring holding one of said contacts normally in contact with the conductor, for the purpose set forth.

11. In underground electric railways, the combination with the slotted underground conduit, of a traveling support and a cleaning device, as a plow, or the like, traveling with the support along the floor of the conduit, said cleaning device removable from such conduit by displacement along its support, for the purpose set forth.

12. In underground electric railways, the combination with the slotted underground conduit and the main conductor therein, of a traveling conductor, a contact-carrier traveling therewith and provided with contacts for both the aforementioned conductors, and a cleaning device, as a plow, scraper, or brush, connected with said carrier and traveling along the conduit-floor, said carrier movable out of said conduit by displacement on the traveling conductor, for the purpose set forth.

13. The combination with the motor-car, the tubular support $s^2$ rigidly connected therewith and the conductor $r^2$ extending through and projecting from the lower end of said support, and the flanged bearing $u$ secured to the lower end of the conductor; of the carrier-sleeve $s$ loosely mounted on said bearing and support and provided with a radial opening leading to the lower end of the conductor, and a spring-controlled contact-arm pivoted to said sleeve and provided with a contact projecting through the sleeve opening into contact with the conductor, for the purpose set forth.

14. In electric railways, the combination with the motor-car, the tubular support $s^2$ rigidly connected with said car, the conductor $r^2$ extending through said support, and the cylindrical flanged bearing $u$ secured to the lower end of the conductor below the support; of the carrier-sleeve $s$, revoluble and movable vertically on said bearing $u$ and support $s^2$, and provided with an opening leading to the lower end of said conductor $r^2$, a spring-controlled contact-arm pivotally connected with the carrier-sleeve and provided with a contact projecting through the sleeve opening into contact with the conductor $r^2$, and a cleaning device, as a brush, plow or scraper carried by said carrier-sleeve, for the purpose set forth.

15. In electric railways, the combination with the main line, the underground conduit, the main conductor therein and a guide-track as $e^2$, a branch line, its underground conduit and main conductor therein and a guide-track as $e^2$; of a switch-tongue provided with a guide-track $e'$ adapted to register with the aforesaid guide-tracks $e^2$, for the purpose set forth.

16. In electric railways, the combination with the main line, the underground conduit, the main conductor therein, a branch line, its underground conduit and main conductor therein both conductors carried along the upper portion of the conduits, and guide-tracks converging downwardly from the respective conductors; of a switch-tongue interposed between the main and branch lines, provided with a guide-track adapted to register with the terminals of the conduit-tracks, and suitable electrical connections between the main and branch line conductors, for the purpose set forth.

17. In electric railways, a main underground conduit provided with the usual surface slot, and an auxiliary conduit open at its lower end insertible into the main conduit through the slot thereof, for the purpose set forth.

18. In electric railways, a main underground conduit provided with the usual surface slot and a sectional auxiliary conduit insertible into and removable from said main conduit through the slot thereof, and means for securing the auxiliary-conduit sections to one side of the main conduit, for the purpose set forth.

19. In electric railways, a main underground conduit provided with the usual surface slot and a sectional auxiliary conduit open at its lower end and partitioned off into air-chambers, said auxiliary conduit insertible into the main conduit through the slot thereof, for the purpose set forth.

20. The combination with the underground slotted conduit, of an auxiliary conduit composed of an inverted-U-shaped sheet-metal casing of a diameter less than that of the conduit-slot, and having one side longer than the other, and means for securing said casing to one of the side walls of the conduit through its slot, for the purpose set forth.

21. The combination with the slotted underground conduit, of an auxiliary conduit consisting of an inverted-U-shaped casing of a diameter less than that of the conduit-slot and having one side longer than the other, fastening-bolts passing through the longer side of said casing and through one of the side walls of the conduit, and a nut for and screwing onto the outer ends of said bolts whereby said auxiliary conduit can be introduced into the main conduit through the slot of the latter and secured in position from the outside of said main conduit, substantially as set forth.

22. The combination with the underground slotted conduit, of an auxiliary conduit consisting of an inverted-U-shaped casing of a diameter less than that of the conduit-slot, and having one of its sides longer than the other, a wedge-shaped filler $m$ at each end of said casing whereby reverse inclines are formed by abutting casings, means for securing the filler within the casing, bolts passing through the longer side of said casing and through one of the walls of the main conduit, and a nut for screwing onto the outside of each bolt, for the purpose set forth.

In testimony that I claim the foregoing as my invention I have signed my name, in presence of two witnesses, this 27th day of May, 1895.

EDUARD LACHMANN.

Witnesses:
DIEDRICH PETERSEN,
CHAS. H. BURKE.